United States Patent
Shimizu

(10) Patent No.: US 12,327,849 B2
(45) Date of Patent: Jun. 10, 2025

(54) BATTERY COOLING DEVICE

(71) Applicant: TOYOTA JIDOSHA KABUSHIKI KAISHA, Toyota (JP)

(72) Inventor: Hajime Shimizu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/352,728

(22) Filed: Jul. 14, 2023

(65) Prior Publication Data

US 2024/0088471 A1 Mar. 14, 2024

(30) Foreign Application Priority Data

Sep. 12, 2022 (JP) ................................. 2022-144737

(51) Int. Cl.
| | |
|---|---|
| H01M 10/63 | (2014.01) |
| G05D 9/12 | (2006.01) |
| H01M 10/613 | (2014.01) |
| H01M 10/6568 | (2014.01) |

(52) U.S. Cl.
CPC ............. *H01M 10/63* (2015.04); *G05D 9/12* (2013.01); *H01M 10/613* (2015.04); *H01M 10/6568* (2015.04); *H01M 2220/20* (2013.01)

(58) Field of Classification Search
CPC ............ H01M 10/63; H01M 10/613; H01M 10/6568; H01M 2220/20; H01M 10/625; H01M 10/6556; H01M 10/42; G05D 9/12; Y02E 60/10
USPC ......................................................... 165/301
See application file for complete search history.

(56) References Cited

U.S. PATENT DOCUMENTS

| | | | |
|---|---|---|---|
| 8,703,318 B2 * | 4/2014 | Payne | H01M 10/6568 429/120 |
| 9,570,729 B2 * | 2/2017 | Schmidt | H01M 10/18 |
| 11,688,902 B2 * | 6/2023 | Kim | H01M 10/647 429/120 |
| 2014/0011059 A1 * | 1/2014 | Hashimoto | B60L 1/003 429/72 |

(Continued)

FOREIGN PATENT DOCUMENTS

| | | | | |
|---|---|---|---|---|
| EP | 1793446 A1 * | 6/2007 | | B60L 11/1881 |
| JP | 11-016608 A | 1/1999 | | |

(Continued)

OTHER PUBLICATIONS

JPH1116608A Machine Translation (Year: 1999).*

*Primary Examiner* — Claire E Rojohn, III
*Assistant Examiner* — Gustavo A Hincapie Serna
(74) *Attorney, Agent, or Firm* — Sughrue Mion, PLLC

(57) ABSTRACT

A battery cooling device, including a plurality of coolers to cool a battery using insulating oil, includes: a communication pipe to connect the plurality of coolers to each other, the communication pipe allowing the insulating oil to flow therethrough; a water level sensor provided in a vertical portion of the communication pipe, the vertical portion extending in a vertical direction, and detects a water level in the vertical portion; a shutdown valve provided in the communication pipe; and a control device configured to control the shutdown valve. Further, the control device closes the shutdown valve when the water level sensor detects a water level rise equal to or greater than a predetermined value.

2 Claims, 3 Drawing Sheets

(56) References Cited

U.S. PATENT DOCUMENTS

| | | | |
|---|---|---|---|
| 2014/0349153 A1* | 11/2014 | Ko | H01M 10/6567 |
| | | | 429/82 |
| 2015/0380782 A1* | 12/2015 | Youngs | H01M 10/613 |
| | | | 429/72 |
| 2019/0140327 A1* | 5/2019 | Fukada | H01M 50/24 |
| 2020/0212507 A1* | 7/2020 | Shimizu | H01M 10/613 |
| 2021/0016628 A1* | 1/2021 | Kozasa | H01M 10/613 |
| 2022/0021071 A1* | 1/2022 | Shimizu | H01M 10/633 |
| 2022/0154992 A1* | 5/2022 | Siddiqui | F28D 20/021 |
| 2024/0396121 A1* | 11/2024 | Ikeda | H01M 10/63 |
| 2025/0046912 A1* | 2/2025 | Han | H01M 50/242 |

FOREIGN PATENT DOCUMENTS

| | | | |
|---|---|---|---|
| JP | H1116608 A | * | 1/1999 |
| JP | 2002-298885 A | | 10/2002 |
| JP | 2007-082288 A | | 3/2007 |
| JP | 2009-009853 A | | 1/2009 |

* cited by examiner

BATTERY COOLING DEVICE

CROSS-REFERENCE TO RELATED APPLICATION(S)

The present application claims priority to and incorporates by reference the entire contents of Japanese Patent Application No. 2022-144737 filed in Japan on Sep. 12, 2022.

BACKGROUND

The present disclosure relates to a battery cooling device.

JP H11-016608 A discloses that an interface between an electrolytic solution and insulating oil in a container is detected by a sensor in a structure in which the insulating oil can enter the container from an upper portion of the container of a battery cell in order to equalize pressure inside and outside the battery cell while the insulating oil is stored around the battery cell.

SUMMARY

There is a need for providing a battery cooling device capable of maintaining insulation properties even when water is mixed into insulating oil used to cool a battery.

According to an embodiment, a battery cooling device, including a plurality of coolers to cool a battery using insulating oil, includes: a communication pipe to connect the plurality of coolers to each other, the communication pipe allowing the insulating oil to flow therethrough; a water level sensor provided in a vertical portion of the communication pipe, the vertical portion extending in a vertical direction, and detects a water level in the vertical portion; a shutdown valve provided in the communication pipe; and a control device configured to control the shutdown valve. Further, the control device closes the shutdown valve when the water level sensor detects a water level rise equal to or greater than a predetermined value.

DETAILED DESCRIPTION

In the related art, the configuration described in JP H11-016608 A is based on the assumption that the height of the interface between the electrolytic solution and the insulating oil in the container is monitored by the sensor, and is not based on the assumption that water or the like is mixed into the insulating oil. On the other hand, in a configuration in which a battery is cooled by insulating oil, if water is mixed into the insulating oil, insulation properties may deteriorate.

Hereinafter, a battery cooling device according to an embodiment of the present disclosure will be specifically described with reference to the drawings. Note that the present disclosure is not limited to the embodiments described below.

Figure 1:
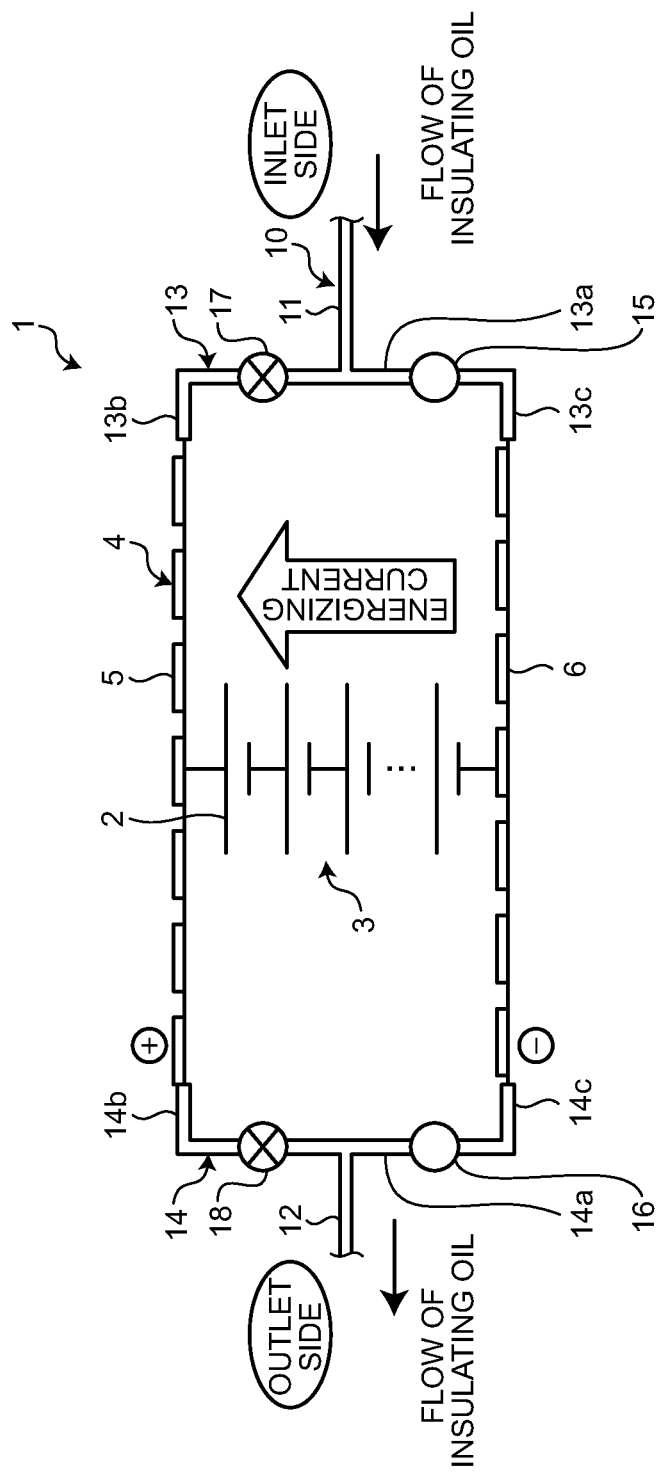
FIG. 1 is a diagram schematically illustrating a battery cooling device according to an embodiment.

FIG. 1 is a diagram schematically illustrating a battery cooling device according to an embodiment. A battery cooling device 1 cools a battery module 3 in which a plurality of battery cells 2 are stacked. The battery cooling device 1 includes a plurality of coolers 4 configured to cool a battery with a refrigerant having insulation properties. The battery cooling device 1 is mounted on a vehicle, and a battery to be cooled supplies electric power to a traveling motor of the vehicle. This battery represents the battery cell 2 and the battery module 3.

The battery cell 2 is formed in a structure in which the cell directly conducts a current in a stacking direction of an electrode plane such as a bipolar electrode. The battery module 3 has a stacked structure in which a plurality of battery cells 2 are stacked, and is configured so that a stacking direction of the battery cells 2 and a direction in which an energizing current flows are the same direction.

In the battery cooling device 1, in order to efficiently cool a planar electrode of the battery cells 2, the flat plate-shaped cooler 4 is inserted between the planar electrodes, and a refrigerant having insulation properties flows inside the cooler 4. Since the cooler 4 exists in the planar electrode of the battery module 3, the cooler 4 is in the energizing path. Therefore, the energizing voltage is also applied to the refrigerant in the cooler 4. The refrigerant having insulation properties for cooling the battery cell 2 is insulating oil.

In the battery cooling device 1, when water or the like is mixed into the insulating oil, a water mass may be formed inside an insulating oil pipe 10 through which the insulating oil flows. In this case, when the water mass has a shape straddling the two electrodes of the battery module 3, insulation properties are impaired, and an energizing current is generated. In other words, in a state where the insulating oil and water are stirred and turbid inside the insulating oil pipe 10, fine water particles float in the insulating oil. In this turbid state, the water mass is not formed in the insulating oil pipe 10, and the insulation properties are secured, that is, the insulating oil is insulated, so that no energizing current is generated.

Since water has a specific gravity higher than that of oil, when the flow of the insulating oil is stopped at the time of soaking the vehicle or the like, turbid water particles gather under the insulating oil pipe 10 (under a refrigerant passage) by gravity to form a water mass. In the battery cooling device 1, water level sensors 15 and 16 are disposed in the refrigerant passage where the liquid level of the water mass is likely to be generated in the insulating oil pipe 10, and the same are configured to detect the mixture of water. The battery cooling device 1 has a structure in which the water level sensors 15 and 16 are provided at portions having components in the vertical direction in communication pipes 13 and 14 connecting two coolers 5 and 6.

Figure 3:
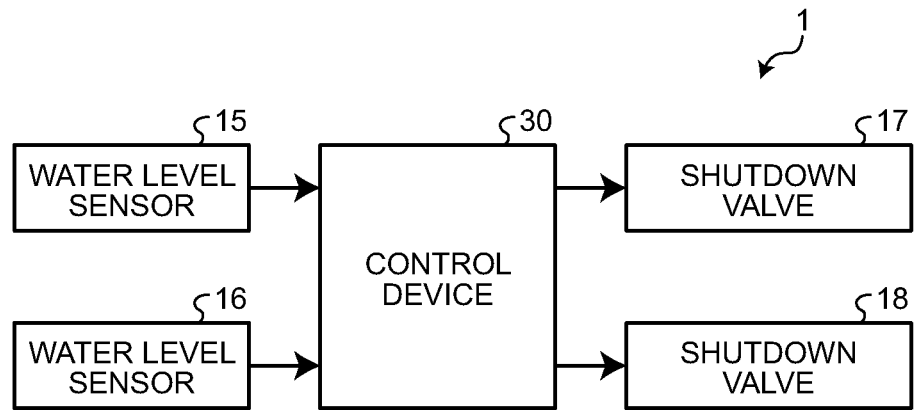
FIG. 3 is a block diagram illustrating a control device.

Specifically, the battery cooling device 1 includes the cooler 4, the insulating oil pipe 10, the water level sensors 15 and 16, shutdown valves 17 and 18, and a control device 30 (illustrated in FIG. 3).

The cooler 4 includes at least two coolers. As illustrated in FIG. 1, the cooler 4 includes the first cooler 5 disposed on one side and the second cooler 6 disposed on the other side in the stacking direction of the battery modules 3. The stacking direction of the battery modules 3 is the same as the vertical direction of the vehicle.

The first cooler 5 is an upper cooler disposed above the second cooler 6 in the vertical direction of the vehicle. The energizing current of the battery module 3 is applied to the insulating oil flowing inside the first cooler 5. For example, the first cooler 5 functions as a positive-electrode-side current collector plate of the battery module 3.

The second cooler 6 is a lower cooler disposed below the first cooler 5 in the vertical direction of the vehicle. The energizing current of the battery module 3 is applied to the insulating oil flowing inside the second cooler 6. For example, the second cooler 6 functions as a negative-electrode-side current collector plate of the battery module 3.

The insulating oil pipe 10 is a refrigerant passage through which insulating oil flows. The insulating oil pipe 10 is connected to the cooler 4. The insulating oil pipe 10 includes a supply pipe 11, an outflow pipe 12, and the communication pipes 13 and 14.

The supply pipe 11 is a refrigerant passage formed on the inlet side of the cooler 4. Insulating oil is supplied from the supply pipe 11 to the cooler 4. The downstream side of the supply pipe 11 is connected to the communication pipe 13.

The communication pipe 13 is a first communication pipe formed between the supply pipe 11 and the inlet of the cooler 4, and is connected to the inlets of the plurality of coolers 4. The communication pipe 13 includes a vertical portion 13*a*, a first connection portion 13*b*, and a second connection portion 13*c*.

The vertical portion 13*a* is a portion of the communication pipe 13 extending in the vertical direction. That is, the vertical portion 13*a* extends linearly in the stacking direction of the battery modules 3 and the vertical direction of the vehicle. The vertical portion 13*a* communicates with the supply pipe 11 at an intermediate position in the vertical direction. The vertical portion 13*a* communicates with the first connection portion 13*b* at an upper end position in the vertical direction, and communicates with the second connection portion 13*c* at a lower end position in the vertical direction.

The first connection portion 13*b* is a portion connected to the inlet of the first cooler 5 and formed to extend in a horizontal direction. The second connection portion 13*c* is a portion connected to the inlet of the second cooler 6 and formed to extend in the horizontal direction. In the vertical direction of the vehicle, the first connection portion 13*b* is disposed above the second connection portion 13*c*.

The insulating oil supplied from the supply pipe 11 to the communication pipe 13 is supplied from the upper first connection portion 13*b* to the first cooler 5 and from the lower second connection portion 13*c* to the second cooler 6 via the vertical portion 13*a*. In the communication pipe 13 on the inlet side, the insulating oil supplied to the cooler 4 is branched into the first cooler 5 side and the second cooler 6 side.

The outflow pipe 12 is a refrigerant passage formed on the outlet side of the cooler 4. The insulating oil that has cooled the cooler 4 flows through the outflow pipe 12. The upstream side of the outflow pipe 12 is connected to the communication pipe 14.

The communication pipe 14 is a second communication pipe formed between the outlet of the cooler 4 and the outflow pipe 12, and is connected to the outlets of the plurality of coolers 4. The communication pipe 14 includes a vertical portion 14*a*, a first connection portion 14*b*, and a second connection portion 14*c*.

The vertical portion 14*a* is a portion of the communication pipe 14 extending in the vertical direction. That is, the vertical portion 14*a* extends linearly in the stacking direction of the battery modules 3 and the vertical direction of the vehicle. The vertical portion 14*a* communicates with the outflow pipe 12 at an intermediate position in the vertical direction. The vertical portion 14*a* communicates with the first connection portion 14*b* at an upper end position in the vertical direction, and communicates with the second connection portion 14*c* at a lower end position in the vertical direction.

The first connection portion 14*b* is a portion connected to the outlet of the first cooler 5 and formed to extend in the horizontal direction. The second connection portion 14*c* is a portion connected to the outlet of the second cooler 6 and formed to extend in the horizontal direction. In the vertical direction of the vehicle, the first connection portion 14*b* is disposed above the second connection portion 14*c*.

The insulating oil supplied from the upper first cooler 5 to the first connection portion 14*b* is supplied to the outflow pipe 12 via the vertical portion 14*a*. The insulating oil supplied from the lower second cooler 6 to the second connection portion 14*c* is supplied to the outflow pipe 12 via the vertical portion 14*a*. In the communication pipe 14 on the outlet side, the insulating oil that has cooled the first cooler 5 and the insulating oil that has cooled the second cooler 6 merge.

The water level sensor 15 is a first water level sensor provided in the vertical portion 13*a* of the communication pipe 13 on the inlet side, and detects the water level of the vertical portion 13*a*. The water level sensor 15 is disposed at a position closer to the second connection portion 13*c* than the first connection portion 13*b* in the vertical direction, that is, disposed at a relatively lower position in the vertical portion 13*a*.

The water level sensor 16 is a second water level sensor provided in the vertical portion 14*a* of the communication pipe 14 on the outlet side, and detects the water level of the vertical portion 14*a*. The water level sensor 16 is disposed at a position closer to the second connection portion 14*c* than the first connection portion 14*b* in the vertical direction, that is, disposed at a relatively lower position in the vertical portion 14*a*.

The shutdown valve 17 is a first shutdown valve provided on the communication pipe 13 on the inlet side, and selectively closes the communication pipe 13. The shutdown valve 17 is made of an insulating material such as resin, and is configured so that a component in contact with the insulating oil does not contain metal. In the example illustrated in FIG. 1, the shutdown valve 17 is provided in the vertical portion 13*a* of the communication pipe 13, and the shutdown valve 17 is disposed above the water level sensor 15 in the vertical direction.

The shutdown valve 18 is a second shutdown valve provided on the communication pipe 14 on the outlet side, and selectively closes the communication pipe 14. The shutdown valve 18 is made of an insulating material such as resin, and is configured so that a component in contact with the insulating oil does not contain metal. In the example illustrated in FIG. 1, the shutdown valve 18 is provided in the vertical portion 14*a* of the communication pipe 14, and the shutdown valve 18 is disposed above the water level sensor 16 in the vertical direction.

Figure 2:
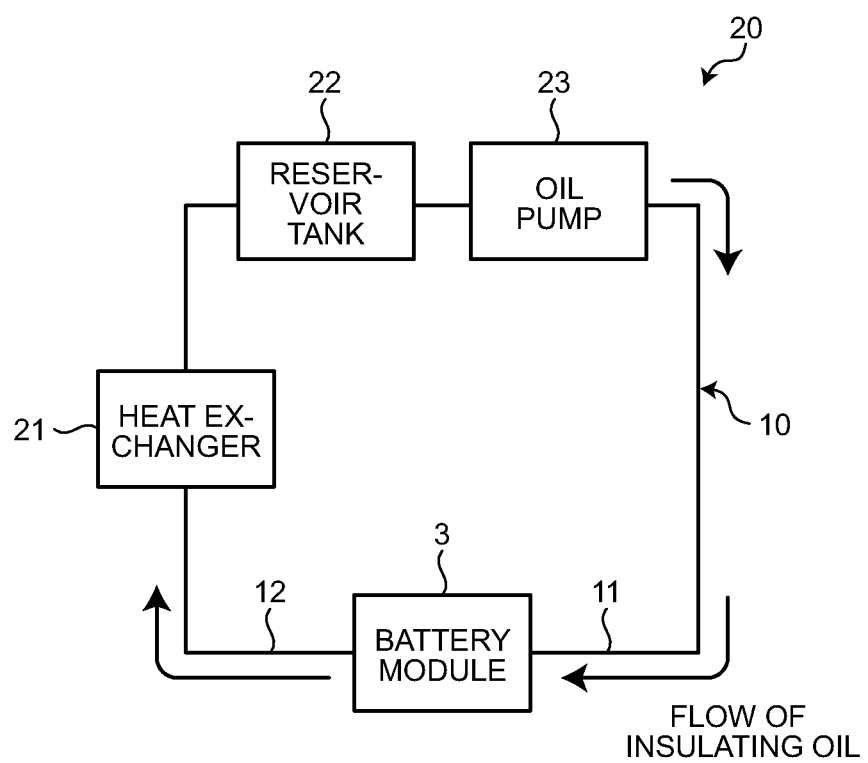
FIG. 2 is a diagram illustrating a circulation circuit of insulating oil.

The battery cooling device 1 is configured so that the insulating oil circulates. As illustrated in FIG. 2, the insulating oil circulates in a circulation circuit 20. The circulation circuit 20 functions as a circuit configured to manage heat of the battery module 3. The circulation circuit 20 includes a heat exchanger 21, a reservoir tank 22, and an oil pump 23.

The heat exchanger 21 exchanges heat between a refrigerant of another system and insulating oil. For example, the heat exchanger 21 includes a chiller. The heat exchanger 21 functions to cool insulating oil by transferring heat of insulating oil in the circulation circuit 20 to the refrigerant of the another system. The reservoir tank 22 stores insulating oil. The oil pump 23 pumps insulating oil so that the insulating oil circulates in the circulation circuit 20.

When the oil pump 23 discharges the insulating oil and the insulating oil is pumped to the insulating oil pipe 10, the insulating oil is supplied from the supply pipe 11 to the cooler 4 of the battery module 3. The insulating oil after cooling the battery module 3 is supplied to the heat exchanger 21 through the outflow pipe 12. The insulating oil cooled by the heat exchanger 21 is stored in the reservoir tank 22. The oil pump 23 suctions the insulating oil from a suction port on the reservoir tank 22 side and discharges the insulating oil from a discharge port on the cooler 4 side.

When the circulation circuit 20 is mounted on the vehicle, the battery module 3 is disposed below the heat exchanger 21, the reservoir tank 22, and the oil pump 23 in the vertical direction of the vehicle. Therefore, at the time of vehicle soaking, water mixed into the insulating oil present in the insulating oil pipe 10 between the oil pump 23 and the battery module 3 gathers in the supply pipe 11 located on the lower side. Similarly, water mixed into the insulating oil present in the insulating oil pipe 10 between the heat exchanger 21 and the battery module 3 gathers in the outflow pipe 12 located on the lower side.

Therefore, as illustrated in FIG. 1, the water level sensor 15 is provided in the vertical portion 13a on the inlet side communicating with the supply pipe 11, and the water level sensor 15 in the vertical portion 13a detects the water level. Further, the water level sensor 16 is provided in the vertical portion 14a on the outlet side communicating with the outflow pipe 12, and the water level sensor 16 in the vertical portion 14a detects the water level.

As illustrated in FIG. 3, the battery cooling device 1 includes the control device 30 configured to control the open or closed state of the shutdown valves 17 and 18. The control device 30 is an electronic control device configured to control the battery cooling device 1. The electronic control device includes a microcontroller including a CPU, an RAM, an ROM, and an input/output interface. Signals from the water level sensors 15 and 16 are input to the control device 30. Then, the control device 30 executes opening/closing control of the shutdown valves 17 and 18 based on the signals input from the water level sensors 15 and 16.

Figure 4:
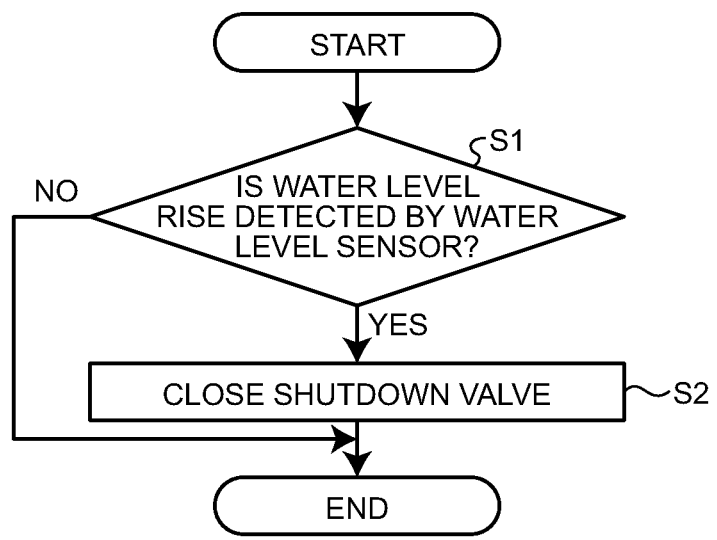
FIG. 4 is a flowchart illustrating an opening/closing control flow.

FIG. 4 is a flowchart illustrating an opening/closing control flow. The control illustrated in FIG. 4 is executed by the control device 30.

The control device 30 determines whether or not at least one of the water level sensor 15 on the inlet side and the water level sensor 16 on the outlet side has detected a water level rise (step S1). When it is determined that neither the water level sensor 15 on the inlet side nor the water level sensor 16 on the outlet side has detected a water level rise (step S1: No), this control routine ends.

When it is determined that at least one of the water level sensor 15 on the inlet side and the water level sensor 16 on the outlet side has detected a water level rise (step S1: Yes), the control device 30 closes the shutdown valves 17 and 18 in the communication pipes 13 and 14 (step S2). In step S2, the shutdown valves 17 and 18 on both the inlet side and the outlet side may be closed, or only the shutdown valve on a side where the water level rise is detected may be closed. That is, the shutdown valve disposed at least on the side where the water level rise is detected between the inlet side and the outlet side is closed.

As described above, according to the embodiment, the shutdown valves 17 and 18 are closed when the water level rise is detected in the vertical portions 13a and 14a of the communication pipes 13 and 14, so that it is possible to prevent a water column formed by water mixed into the insulating oil from straddling two electrodes.

The shutdown valve 17 may not be disposed above the water level sensor 15. The shutdown valve 17 only needs to be provided in the communication pipe 13, and may not necessarily be provided in the vertical portion 13a. For example, the shutdown valve 17 is provided in the second connection portion 13c. Similarly, the shutdown valve 18 may not be disposed above the water level sensor 16. The shutdown valve 18 only needs to be provided in the communication pipe 14, and may not necessarily be provided in the vertical portion 14a. For example, the shutdown valve 18 is provided in the second connection portion 14c.

The number of coolers 4 is not limited to two, and may be three or more. When the number of coolers 4 is three or more, one shutdown valve is provided for each insulating oil pipe connecting two coolers adjacent to each other in the vertical direction. For example, in a case where the number of coolers 4 is three, the coolers 4 are disposed at three portions including upper, middle, and lower positions. Therefore, two coolers adjacent to each other in the vertical direction are a combination of the upper cooler 4 and the middle cooler 4 and a combination of the middle cooler 4 and the lower cooler 4. One shutdown valve is provided in the communication pipe connecting the upper cooler 4 to the middle cooler 4, and one shutdown valve is provided in the communication pipe connecting the middle cooler 4 to the lower cooler 4. Accordingly, by closing the two shutdown valves as necessary, it is possible to prevent a conduction path from being formed across two electrodes.

Although the configuration in which the cooler 4 also serves as a current collector plate has been described, the present disclosure is not limited thereto. The cooler 4 may be disposed between a positive-electrode-side current collector plate of the battery module 3 and a negative-electrode-side current collector plate thereof.

In the battery cooling device 1, the number of battery modules 3 to be cooled is not limited. That is, the battery cooling device 1 can target a battery pack having a structure in which a plurality of battery modules 3 are stacked in the stacking direction.

In the present disclosure, the presence of a water column can be detected by providing a water level sensor in a vertical portion of a communication pipe. Since a shutdown valve is closed when a rise in the water level in the vertical portion is detected, insulation properties can be maintained even when water is mixed into insulating oil used to cool a battery.

According to an embodiment, the presence of a water column can be detected by providing a water level sensor in a vertical portion of a communication pipe. Since a shutdown valve is closed when a rise in the water level in the vertical portion is detected, insulation properties can be maintained even when water is mixed into insulating oil used to cool a battery.

According to an embodiment, a conduction path through a communication pipe can be blocked by closing a valve having insulation properties.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery cooling device including a plurality of coolers configured to cool a battery using insulating oil, the battery cooling device comprising:
   a communication pipe configured to connect the plurality of coolers to each other, the communication pipe allowing the insulating oil to flow therethrough;
   a water level sensor provided in a vertical portion of the communication pipe, the vertical portion extending in a vertical direction, and configured to detect a water level in the vertical portion;
   a shutdown valve provided in the communication pipe; and
   a control device configured to control the shutdown valve, wherein the control device closes the shutdown valve when the water level sensor detects a water level rise equal to or greater than a predetermined value.

2. The battery cooling device according to claim 1, wherein the shutdown valve is formed of a resin insulating member.

* * * * *